C. S. FULLER.

Assignor to C. R. Knickerbocker.

APPARATUS FOR DRYING GROUND WHEAT.

No. 7,618. Reissued April 17, 1877.

Witnesses
W. R. Edelen
W. H. Bliss.

Inventor
Clark S. Fuller
by A. H. Doubleday
atty.

N. PETERS, PHOTO-LITHOGRAPHER, WASHINGTON, D. C.

UNITED STATES PATENT OFFICE.

CLARK S. FULLER, OF LA FAYETTE, INDIANA, ASSIGNOR TO CHARLES R. KNICKERBOCKER, OF JACKSON, MICHIGAN.

IMPROVEMENT IN APPARATUS FOR DRYING GROUND WHEAT.

Specification forming part of Letters Patent No. 162,910, dated May 4, 1875; reissue No. 7,618, dated April 17, 1877; application filed February 28, 1877.

*To all whom it may concern:*

Be it known that I, CLARK S. FULLER, of La Fayette, in the county of Tippecanoe and State of Indiana, have invented certain new and useful Improvements in Apparatus for Drying and Bleaching Ground Wheat; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Within the past few years great attention has been paid to the purification of middlings by means of air-currents. In some machines the material is passed over a flat reciprocating shaker, through which air-currents are drawn or forced in an upward direction, while the middlings, or a portion of them, fall downward. The bran and other refuse matter, being of lighter specific gravity, is separated from the pure middlings by the air-currents.

In other machines or constructions the separation is effected in vertical spouts or trunks, the air-currents moving in an upward direction against the falling middlings.

In still other constructions the purification by means of air-currents is effected in reel-bolts; but in all of these devices advantage is taken of the difference in specific gravity between different portions of the material.

The object of one part of my invention is to effect a thorough separation of the particles of bran and other deleterious matter from flour or middlings; and to this end it consists in subjecting the material to the drying action of artificial heat, and subsequently purifying by the action of air-currents.

Another part of my invention relates to the specific construction of an improved apparatus by means of which heat may be applied to the product of grinding wheat, as will be hereinafter fully described.

Figure 1:
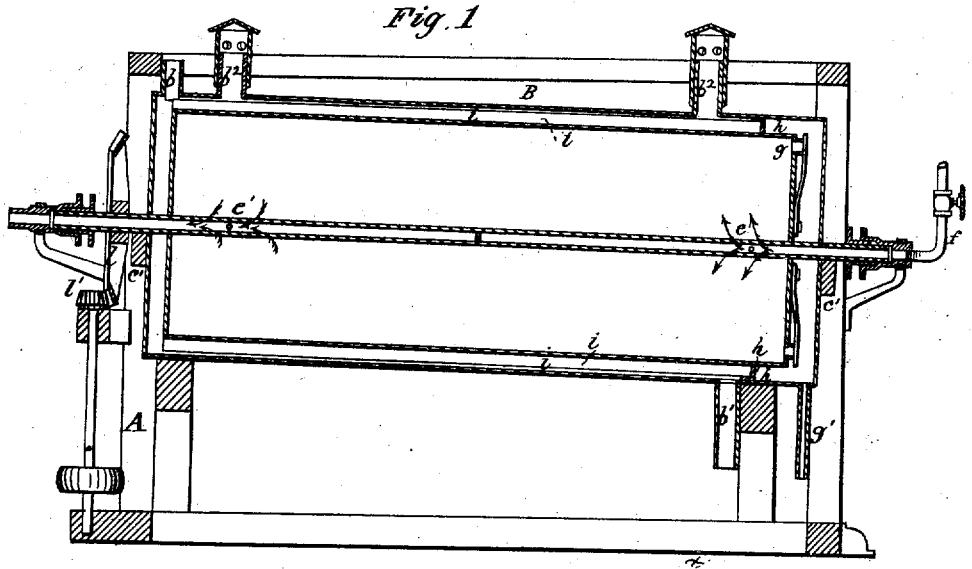
Figure 2:
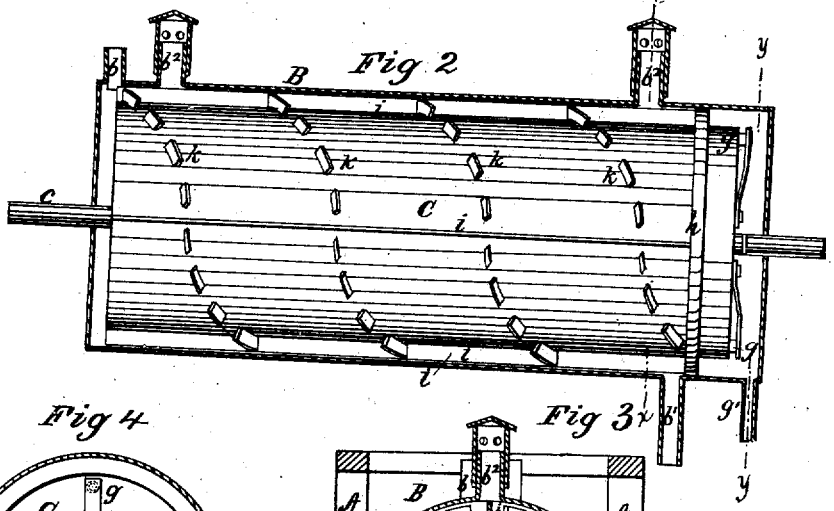
Figure 4:
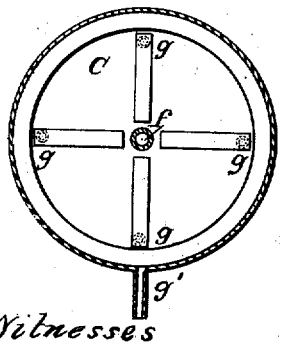
Figure 3:
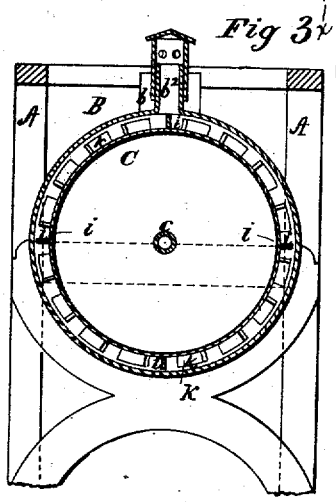

In the accompanying drawings, Figure 1 is a longitudinal section of my improved apparatus. Fig. 2 is a similar view, with the revolving steam-drum in elevation. Figs. 3 and 4 are vertical cross-sections of the apparatus, respectively, on lines *x x* and *y y*, Fig. 2.

Like letters of reference designate like parts in all of the figures.

A is the stationary frame of the apparatus, and B the outer inclosing drying-cylinder supported therein, and provided at its upper end with a spout, *b*, through which the material to be dried is fed into the same, and near its opposite lower end with a spout, $b^1$, for the discharge of the dried material.

It is also provided at its upper side with adjustable ventilators $b^3$, permitting the escape of the vapors evolved during the drying process.

C is the revolving steam-drum arranged within the drying-cylinder B, and secured to a hollow shaft, *c*, passing through the head of the cylinder and revolving in suitable bearings $c^1$.

The bore of the shaft *c* is divided at the center by a partition, *d*, and each part of the bore is provided with openings *e e'*, forming passages to the interior of the steam-drum.

One part of the hollow shaft connects, by means of a trunnion, with the steam-supply pipe *f*, the steam entering the drum C from the shaft by the openings *e*, and the other part of the pipe connects with a discharge-pipe, by which the waste steam escaping from the drum into the hollow shaft by the openings *e'* is conducted to any desired place.

The drum C is preferably arranged slightly inclined, so that the condensed water accumulates at one end, from whence it escapes through openings *g*, provided with spring-valves, into a compartment of the outer case A, from which it is discharged by a waste-pipe, *g'*.

*h* is an annular flange, secured to the surface of the steam-drum near its lower or rear end, so as to fit snugly within the cylinder B, for the purpose of separating the compartment into which the condensed water is discharged by the openings *g* from the main compartment of the cylinder B, in which the material is dried.

*i* are longitudinal ribs, secured to the drum

C and extending from the front end thereof to the flange *h*, so as to elevate the material from the bottom of the drying-cylinder as the drum revolves, to the highest point thereof, and then permit the same to descend over the surface of the drum on the other side.

*k k* represent a number of inclined plates, arranged on the surface of the drum C at a greater or less distance apart, so as to break up the material as it descends over the surface of the drum, and at the same time propel it toward the discharge-spout of the cylinder. The ribs *i* and plates *k* are made of such width as to nearly touch the outer cylinder, and the material is fed in at such a rate as to keep the narrow annular space between the drum and the outer cylinder nearly filled, whereby the drum is kept covered with a layer of the material, and a continuous operation of the apparatus is insured.

The drum is rotated by a gear-wheel, *l*, mounted on the shaft *c* and driven by a pinion, *l'*, or in any other suitable manner.

The chops or ground grain come from the stones in a more or less damp condition, and are fed into the cylinder B by the spout *h'*, and repeatedly passed over the heated drum C by the revolution thereof, whereby all the moisture is expelled from the chops, and the same rendered dry and crisp.

The flour, when damp, has a more or less gray or yellowish appearance, which, by subjecting it to the action of this drying apparatus, is changed to a perfectly white condition, whereby the market value of the flour is considerably increased.

The adhesive quality of the constituents of the chops, especially of the fine bran and fuz, are destroyed by passing it through the drying apparatus, whereby the subsequent separation of the chops into flour, middlings, &c., by bolting, is greatly facilitated, and the gumming up of the meshes of the bolting-cloth is prevented.

Furthermore, the purification of the middlings, which consists in removing therefrom the sharp or fuzzy particles by the action of an air-current, is greatly facilitated, and rendered more perfect after the chops have been subjected to the action of the drying apparatus.

What I claim as my invention is—

1. The combination, with the outer stationary cylinder B, of the revolving steam-drum C, provided on its outer surface with ribs *i* for elevating the material, substantially as hereinbefore set forth.

2. The combination, with the outer stationary cylinder B, of the revolving steam drum C, provided with the longitudinal ribs *i* and interrupted spiral plate *k*, substantially as and for the purpose set forth.

3. The herein-described method of purifying middlings, by subjecting to the action of artificial heat, and then removing the impurities by means of air-currents, substantially as set forth.

In testimony that I claim the foregoing I have hereunto set my hand this 21st day of February, 1877.

CLARK S. FULLER.

Witnesses:

OLIVER C. GOLDSMITH,

CHARLES GROENENDYKE.